United States Patent [19]

Shapiro

[11] Patent Number: 5,864,874
[45] Date of Patent: Jan. 26, 1999

[54] COMMUNITY CO-PRESENCE SYSTEM

[75] Inventor: Ehud Shapiro, Rockville, Md.

[73] Assignee: Ubique Ltd., Ness Ziona, Italy

[21] Appl. No.: 747,373

[22] Filed: Nov. 12, 1996

Related U.S. Application Data

[63] Continuation-in-part of Ser. No. 236,293, May 2, 1994, abandoned, which is a continuation of Ser. No. 827,845, Apr. 11, 1997.

[51] Int. Cl.$^6$ ................................................... G06F 17/30
[52] U.S. Cl. ................................ 707/201; 707/8; 707/10; 707/102
[58] Field of Search ........................... 707/2, 8, 10, 100, 707/102–104, 201–204

[56] References Cited

U.S. PATENT DOCUMENTS

| | | | |
|---|---|---|---|
| 4,775,934 | 10/1988 | Houri et al. | 395/676 |
| 5,008,853 | 4/1991 | Bly et al. | 345/331 |
| 5,159,669 | 10/1992 | Trigg et al. | 345/357 |
| 5,220,657 | 6/1993 | Bly et al. | 711/152 |
| 5,222,221 | 6/1993 | Houri et al. | 395/676 |

OTHER PUBLICATIONS

Masinter and Ostrom, "Collaborative Information Retrieval: Gopher from MOO", Proc. INER '93, pp. DFA–1—DFA–9.
M. Clarkson, "Welcome to my fantasy—a personal tour through shared consensual hallucinations on the Internet"pp. 36–39, Computer Gaming World, V123, Oct. 1994.

"Frequently Asked Questions", Basic Information about Muds and Mudding, Jun. 14, 1993.

*Primary Examiner*—Maria N. Von Buhr
*Attorney, Agent, or Firm*—Skjerven, Morrill, MacPherson, Franklin & Friel LLP

[57] ABSTRACT

A data retrieval system includes a data server a co-presence server and at least two co-presence data retrieval clients. The data server retrieves at least one of a plurality of data objects from a data repository. The co-presence data-retrieval clients communicate at least with the data server and with the co-presence server. The co-presence server includes community means for at least maintaining a list of users associated with a community and at least one virtual place having a list of users from the community at the virtual place. Each of the co-presence data retrieval clients includes object association means and co-presence means. The object association means associate a data object received from the data server with one of the at least one virtual places in the co-presence server. The co-presence means is associated with the one virtual place and associates the client with the community and enables communication at least with other co-presence means also associated with the one virtual place.

4 Claims, 7 Drawing Sheets

COMMUNITY CO-PRESENCE SYSTEM

This application is a continuation-in-part application of U.S. Ser. No. 08/236,293, filed May 2, 1994 now abandoned, which has been continued as U.S. Ser. No. 08/827,845, filed Apr. 11, 1997, pending.

FIELD OF THE INVENTION

The present invention relates to data retrieval systems generally and to data retrieval systems with co-presence mechanisms in particular.

BACKGROUND OF THE INVENTION

Data retrieval systems are known in the art. A typical one is shown in FIG. 1 to which reference is now made. Data retrieval systems typically consist of a data server 10 and multiple data-retrieval clients 12 which are typically separate computers. Upon command of a data-retrieval client 12, the data server 10 accesses a data repository 14, or database, that contains data objects 16 therein. Data objects 16 are typically files of information. The data-retrieval clients 12 also communicate with a user 17, typically through an interactive display 18.

A typical data retrieval operation, depicted in FIG. 2 to which reference is now made, proceeds as follows: upon receipt of an instruction (arrow 1) from the user 17 to retrieve a certain data object 16, the data-retrieval client 12 sends (arrow 2) a request to the data server 10 on which the object resides. The data server 10 retrieves the requested data object 16 (arrow 3) from the data repository 14 and sends the object 16 back (arrow 4) to the data-retrieval client 12. The data-retrieval client 12 then displays (arrow 5) the retrieved data object 16 to the user 17.

Additional features incorporated in a data retrieval system may include a data-management mechanism that allows a data-retrieval client 12 to create a new data object 16, to modify a retrieved data object 16 and to send the created or modified data object 16 back to the data server 10 for storage in the data repository 14, and a permission mechanism that allows the server 10 to approve or deny certain client requests.

Examples of data retrieval systems, some of which include the additional features, include the file transfer protocol (FTP), hypertext transfer protocol (HTTP), Gopher and network file systems (NFS) standards, network news servers (NNTP), DEC Notes of Digital Electric Corporation of the USA, Lotus Notes of Lotus Inc. of the USA, Novell NetWare of Novell Inc. of the USA, and the relational database management systems (RDBMS) such as those manufactured by Oracle, Sybase, and Informix, all of the USA.

SUMMARY OF THE PRESENT INVENTION

It is an object of the present invention to provide data retrieval systems with a co-presence mechanism with which two or more users, who retrieve the same data object at the same time, can become aware of each other and consequently to communicate with each other in real time. The data retrieval system enables a user who accesses a certain document to discuss it, in real-time, with others who might happen to access the document at the same time. "Co-presence" is the capability to enable two or more to be "present" at a "virtual" place. For example, COLLAGE, developed by the National Center for Supercomputing Applications (NCSA) at the University of Illinois, is a client-server package that supports co-presence over a shared whiteboard. A user copies a data object from a data server to an existing COLLAGE session and then manipulates the data object in the COLLAGE session. Other users which join the COLLAGE session can also manipulate the same data object; however, in order to join the session, the users need to know the collage session address in advance.

The Internet Relay Chat is a real-time, Internet-wide, multi-party, text-based interaction tool. It allows people to interact in real-time about a subject of their choice, and to join and leave virtual "channels" devoted to specific topics.

Multiple-User Dungeons (MUDs) is a family of multi-player interactive games which provide a notion of inter-connected places, wherein each place may contain objects and passages to other places. Players can go from one place to another, communicate with "co-present" players, and interact with the objects in the place.

These co-present systems provide virtual places at which people can communicate. However, the co-presence is not data-related, or created in conjunction with retrieval of a data object, as is provided in the present invention.

In addition, the present invention enables the definition of a community of users. Those of the community which are present at a data object will be co-present with each other but not with users of another community also at the data object.

There is therefore provided, in accordance with a preferred embodiment of the present invention, a data retrieval system including a data server, a co-presence server and at least two co-presence data-retrieval clients. The data server retrieves at least one of a plurality of data objects from a data repository. The co-presence data-retrieval clients communicate at least with the data server and with the co-presence server. The co-presence server includes a community unit and at least one virtual place. The community unit at least maintains a list of co-presence data-retrieval clients associated with a community. The virtual place has a list of co-presence data-retrieval clients from the community at the virtual place and at least enables communication among the co-presence data-retrieval clients associated therewith. Each of the co-presence data retrieval clients includes an object association unit and a co-presence unit. The object association unit associates a data object received from the data server with one of the virtual places in the co-presence server. The co-presence unit is associated with the one virtual place and associates the client with the community. The co-presence unit also enables communication among the co-presence data-retrieval clients associated with the one virtual place.

Additionally, in accordance with a preferred embodiment of the present invention, the community unit also includes a search unit and a communication unit. The search unit provides a first co-presence data retrieval client of a first virtual place with a second virtual place with which a second co-presence data retrieval client is associated. The communication unit provides a communication channel between the first and second virtual places to enable communication between the first and second co-presence data retrieval clients.

Moreover, in accordance with a preferred embodiment of the present invention, the co-presence server includes a changing plurality of place processes, one for each virtual place, and a managing process for providing communication from the co-presence data retrieval clients to the place processes.

Further, in accordance with a preferred embodiment of the present invention, the object association unit comprises a unit for moving to a new virtual place.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
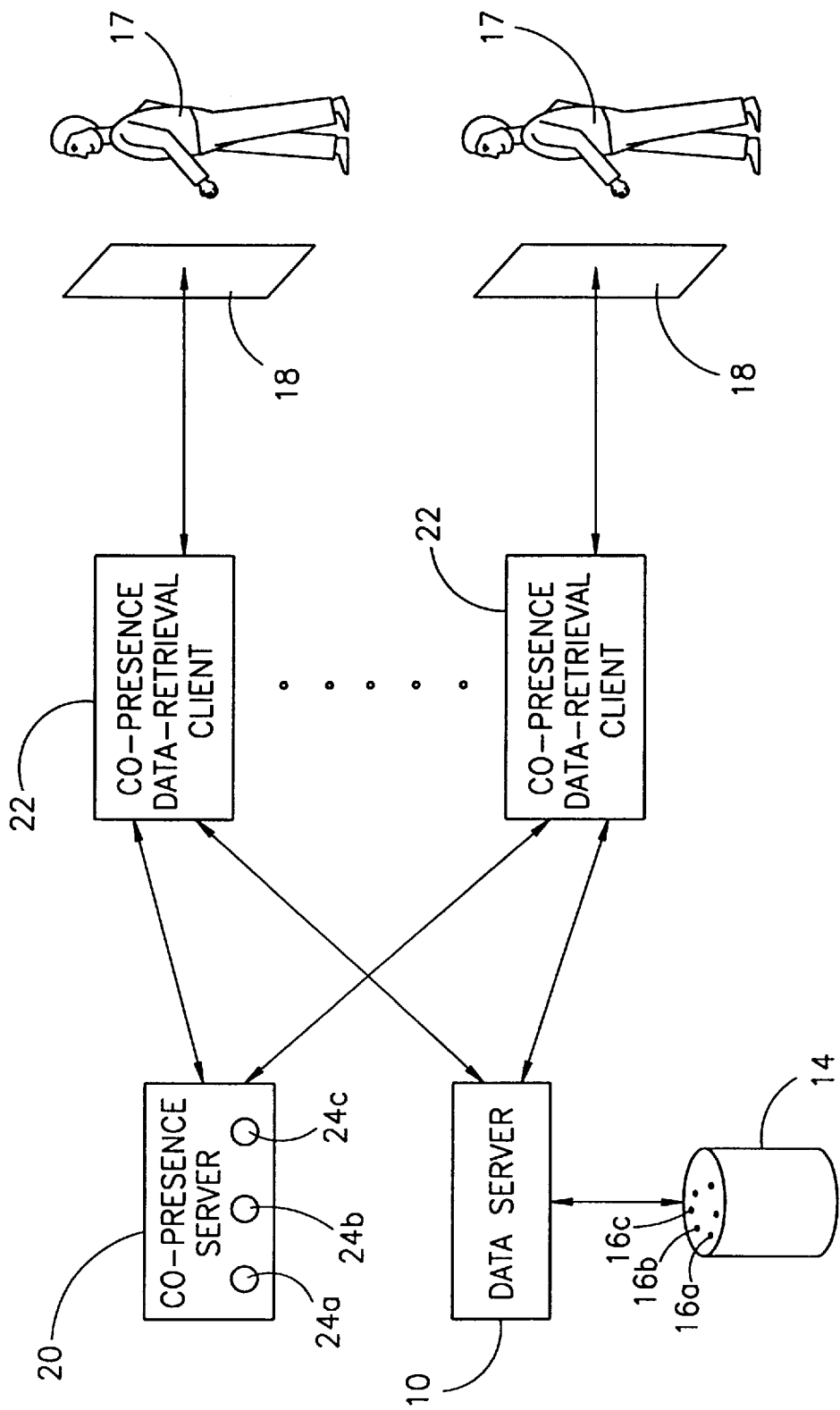
FIG. 3 is a schematic illustration of a data retrieval system with a co-presence server, constructed and operative in accordance with a first preferred embodiment of the present invention.
Figure 4:
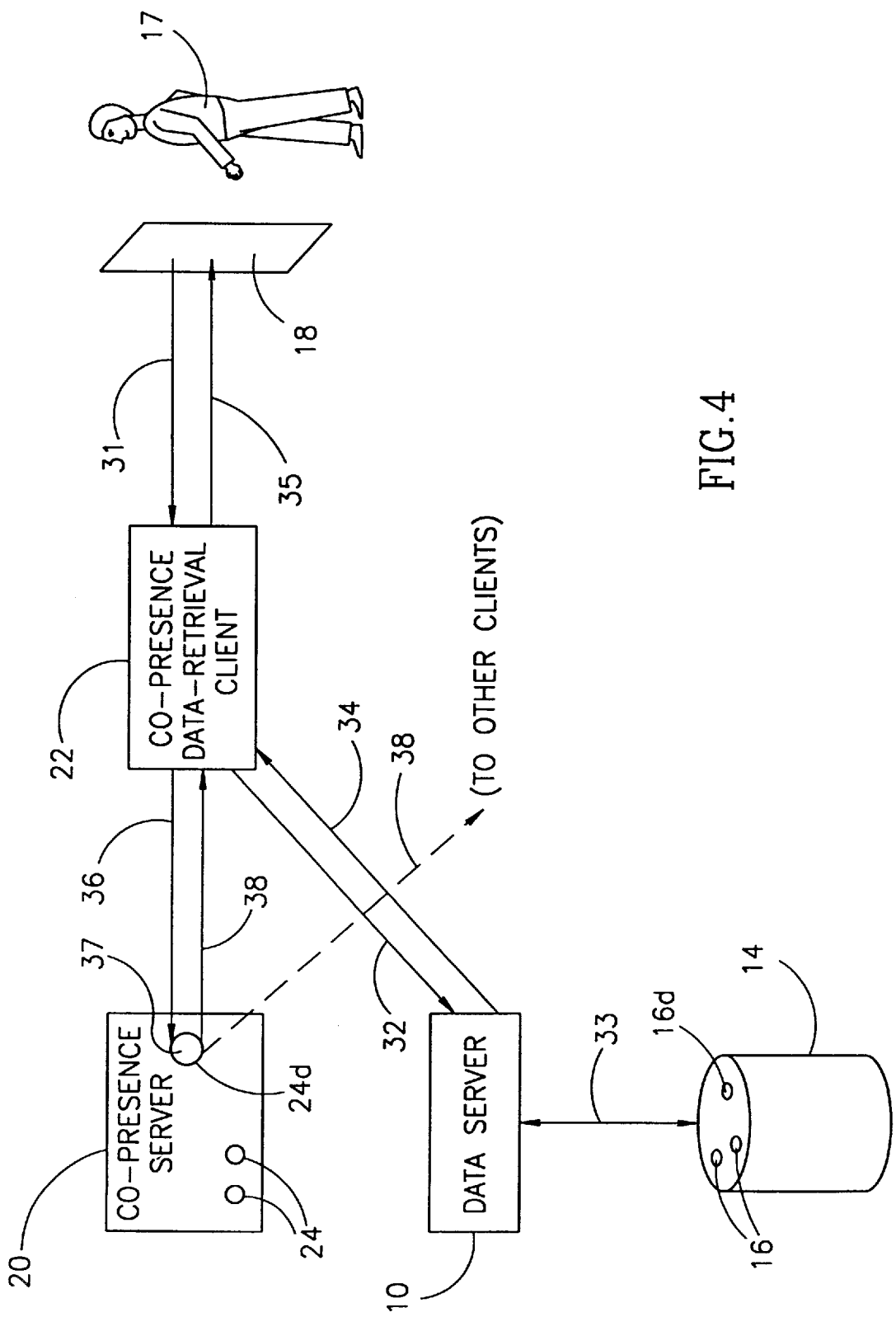
FIG. 4 is a schematic illustration of a co-present data retrieval operation.

Reference is now made to FIGS. 3 and 4 which illustrate the data-retrieval system of the present invention. The system of the present invention typically comprises data server 10 and data repository 14 as in the prior art. It also comprises, in accordance with a preferred embodiment of the present invention, a co-presence server 20 and a multiplicity of co-presence data-retrieval clients 22 each communicating with data server 10, co-presence server 20, and, through the associated display 18, with a user 17.

As in the prior art, each data-retrieval client 22 requests a data object 16 through the data server 10 which retrieves the requested data object 16 from the data repository 14. In addition, in accordance with a preferred embodiment of the present invention, at the same time, the co-presence data-retrieval client 22 also informs the co-presence server 20 that it has retrieved a specific data object 16, for example object 16a. In response, the co-presence server 20 adds the data-retrieval client 22 to a virtual place 24 associated with the retrieved data object 16a. Client 22 associates virtual places 24a–24c with retrieved data objects 16a–16c.

For the purposes of clarity of discussion, we will state that the co-presence server 20 maintains a virtual place 24 for each data object 16 stored in the data server 10. It will be appreciated that the co-presence server 20 can also create a virtual place 24 on demand, when the first user becomes present at the data object 16, and can remove the virtual place 24 when no one is present.

All users which access a data object 16 via data-retrieval client 22 are added to the virtual place 24 associated with the data object 16 that they accessed. In addition, co-presence server 20 provides each virtual place 24 with inter-user communication capabilities such that any user which accesses a data object 16 can communicate, if he so desires, with the other users which are currently utilizing the same data object 16. The co-presence server 20 allows a user 17 who is present at a data object 16 to become aware of other co-present users 17 and provides a means for co-present users 17 to communicate with each other in real time. The communication between users 17 can also be client-to-client if communication through the co-presence server 20 is slow.

The co-presence server 20 essentially turns each data object into a virtual place where users 17 can meet to view the data object 16, to modify it, and to discuss it. For example, if a data server 10 contains user manuals for a certain product, then it might be useful for the product's vendor to place a help-desk person at the virtual place, or places, associated with the user manuals. The help-desk person can then assist, in real-time, those users who access the user manuals, if they need additional assistance or have difficulties "finding their way" through the product's documentation.

The co-presence server 20 and the co-presence data-retrieval client 22 follow a co-presence protocol which is illustrated with arrows 31–38 of FIG. 4.

Figure 1:
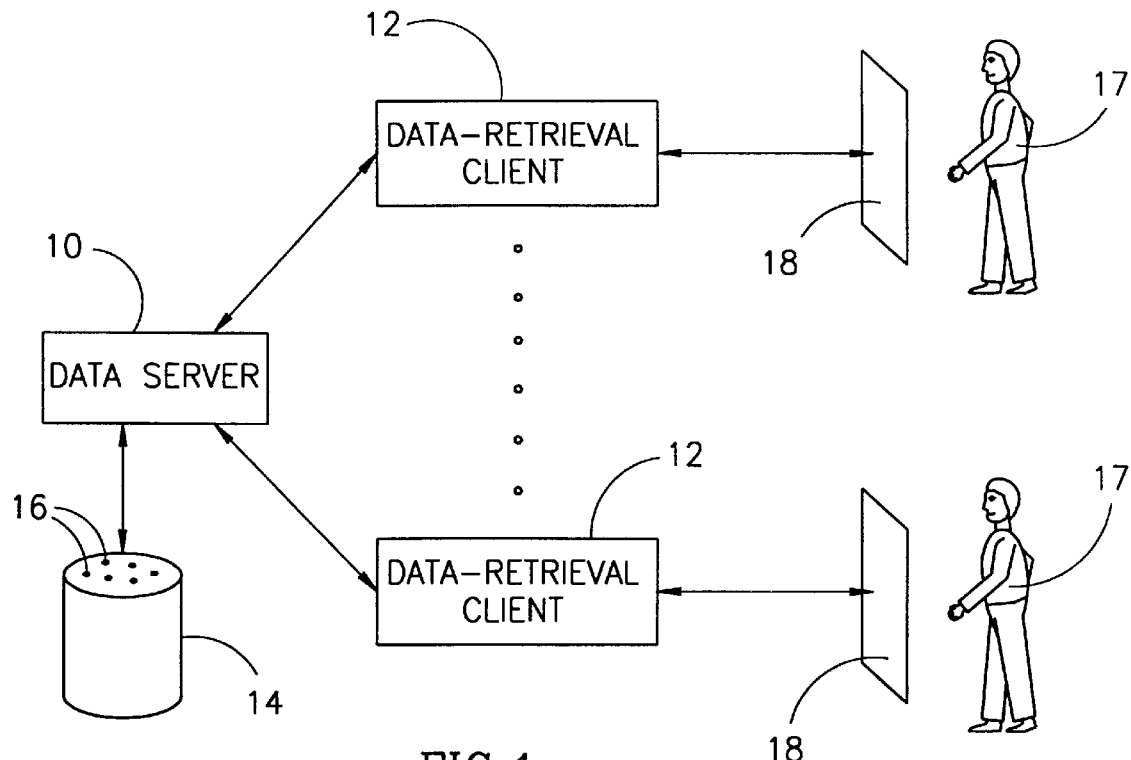
FIG. 1 is a schematic illustration of a prior art data retrieval system.
Figure 2:
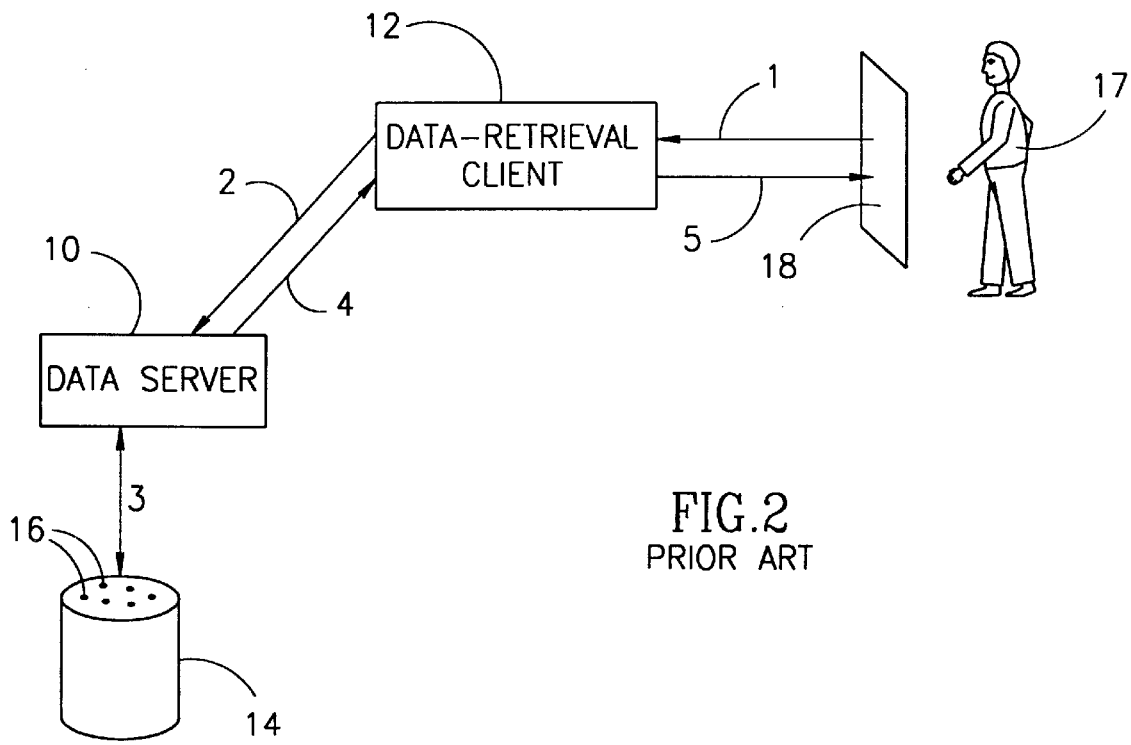
FIG. 2 is a schematic illustration of one prior art data retrieval operation.

A user 17 retrieves a data object 16d from a certain data server 10 in accordance with the protocol described in the prior art (arrows 31–35, similar to arrows 1–5 of FIG. 2). At the same time, the co-presence data-retrieval client 22 sends (arrow 36) a message to virtual place 24d within the co-presence server 20 which is associated with the data object 16d, to the effect that the user has accessed the data object 16d. (Typically, the data objects 16 have well-defined names on the data server 10. Clients 22 utilize the same or corresponding names to identify the corresponding virtual places 24). The virtual place 24d then adds (step 37) the user to the list of co-present users, and sends a message (arrow 38) to that effect to all co-present users, including to the user which just joined the virtual place 24d.

When a user 17 present at a data object 16 wishes to send a message to selected ones of the co-present users 17, the first user 17 sends a message to that effect, via co-presence data-retrieval client 22 and the co-presence server 20, to the associated virtual place 24 which, in turn, relays the message to the selected users 17 present at the data object 16.

When a user 17 ceases to be present at a data object 16 (either due to the retrieval of another data object 16 from the same or another data server 10 or due to closure of its co-presence data-retrieval client 22), the co-presence data-retrieval client 22 sends a message (arrow 36) to that effect to the virtual place 24 which, in turn, deletes the user 17 from the list of co-present users. Virtual place 24 then sends a message (arrow 38) to all remaining co-present users 17 notifying them of the event.

The co-presence protocol can be described by the operations performed by the co-presence data-retrieval client 22 and by the co-presence server 20 and virtual place 24. The following pseudocode describes the protocol:

For the client 22 of user U:
  Assume user U already has document D1 from server S1.
    When user U requests document D2 from server S2:
      1. Attempt to retrieve document D2 from server S2;
      2. -If the retrieval is successful, send the following message to the virtual place P(D1) in co-presence server C(S1) corresponding to document D1: "U left for virtual place D2 in server S2".
    When user U requests to say text T:
      send the message "U said T" to the co-presence server C(S2).
    Upon receipt of message "User V entered (or left) for (from) virtual place P(Dj) in server Sk":
      display to user U the current list of users in the virtual place.
    Upon receipt of the message "V said T":
      display to user U the message "V said T".
For the virtual place P(Di) on co-presence server C(Si)
  Let the set of co-present users be CP:

Upon receipt of message "U left for virtual place P(Dj) in server Sk:
1. Delete user U from the set CP of co-present users
2. Send to every remaining user V in CP the message: "U left for virtual place P(Dj) in server Sk Upon receipt of the message "U entered from virtual place P(Dj) in server Sk:
1. Add user U to the set CP of co-present users
2. Send to every user V in the set CP of co-present users the message "U entered from virtual place P(Dj) in server Sk.

Upon receipt of message "U said T"
Send the message "U said T" to every user in the set CP of co-present users, The co-presence server 20 can be implemented in any way which provides co-presence. In one embodiment, the co-presence server 20 is implemented as a Unix process, executing a concurrent programming language called flat concurrent Prolog (FCP). Using an FCP internal lightweight process mechanism, as described in U.S. Pat. No. 5,222,221 to Houri et al. which is hereby incorporated by reference, each virtual place 24 can be implemented as a place process, each formed of a collection of FCP processes. Each FCP process obeys the co-presence protocol described hereinabove.

The co-presence server 20 receives communications on a pre-assigned and published port whose identity is incorporated in the co-presence data-retrieval client 22. The co-presence server 20 typically receives messages from the co-presence data-retrieval clients 22 and provides them to the appropriate virtual place 24. In addition, if desired, the managing Unix process (the co-presence server 20) can also create a featherweight process (virtual place 24) whenever a first user accesses a data object 16 and can remove a process whenever there cease to be users co-present at the relevant virtual place 24.

It will be appreciated that, because communication with the co-presence server 20 is separate from the data-retrieval operations, the data-retrieval system of the present invention can operate with standard data-retrieval clients 12 which do not have any co-presence capability.

It will further be appreciated that the system of the present invention can easily be created from an existing prior art data-retrieval system. The upgrading process involves adding a co-presence server 20, as described hereinabove, and modifying the data-retrieval clients 12 to become co-presence data-retrieval clients 22 through the addition of the following capabilities:
a) the ability to open an additional communication channel with the co-presence server 20;
b) the ability to map data objects 16 to virtual places 24;
c) the ability to display co-presence information;
d) the ability to enable users 17 to communicate in real time; and
e) the ability to notify the co-presence server 20 when the client 22 is terminated or closed down.

It will be appreciated that data-retrieval clients which have not been upgraded can still operate within the data-retrieval system of FIGS. 3 and 4.

Figure 5:
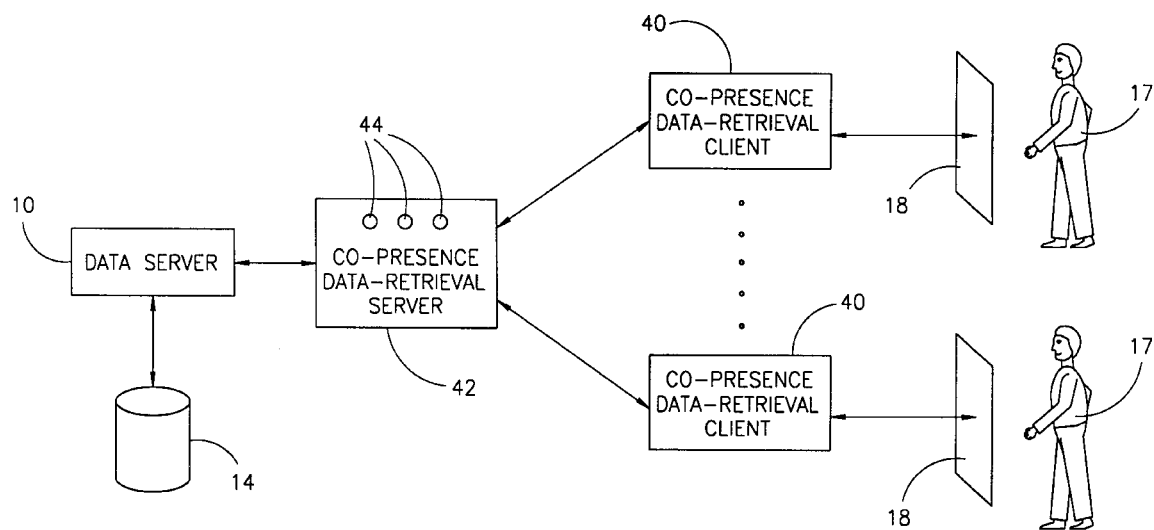
FIG. 5 is a schematic illustration of an alternative embodiment of a co-present data-retrieval system and its operation.

Reference is now made to FIG. 5 which illustrates an alternative embodiment of the present invention. In this embodiment, the data-retrieval system comprises the same elements but they are configured in a different manner. Specifically, the data-retrieval system comprises co-presence data-retrieval clients, labeled 40, and a co-presence data-retrieval server 42, as well as data server 10 and data repository 14 as in the prior art.

In this alternative embodiment, the co-presence data-retrieval clients 40 communicate only with the co-presence data-retrieval server 42, providing to it their data retrieval requests, which the server 42, in turn, passes to the data server 10, and their co-presence communication. The co-presence data-retrieval server 42 includes virtual places 44. There can also be many servers 42, each of which handles data retrieval requests for its associated data server 10.

The following is a pseudo code describing the protocol between clients 40 and server 42:
For client 42 of user U:
Assume user currently has document D1 in server S1.
When user requests document D2 from server S2:
1. Send message "U requests to enter from place P(D1) in server S1" to place P(D2) in co-presence server C(S2)
2. If data-retrieval is successful, send the message "U Left for place P(D2) in server S2" to place P(D1) in co-presence server C(S1)
When user U requests to say text T:
Send the message "U said T" to the co-presence server C(S2)
Upon receipt of message "V entered (left) for (from) place Dj in server Si":
Display to the user U the current co-present users in the place P(Dj)
Upon receipt of message "V said T":
Display to the user U the message from user V.
For the virtual place P(Di) on co-presence server C(Si)
Let the set of co-present users be CP:
Upon receipt of message "U left for virtual place P(Dj) in server Sk":
1. Delete user U from the set CP of co-present users
2. Send to every remaining user V in CP the message: "U left for virtual place P(Dj) in server Si"
Upon receipt of the message "U requests to enter from virtual place P(Dj) in server Sk":
1. Attempt to retrieve data from data server 10
2. If successful:
a. Send the data to client 42 of user U
b. Add user U to the set CP of co-present users
c. Send to every user V in the set CP of co-present users the message "U entered from virtual place P(Di) in server Si".
Upon receipt of message "U said T"
Send the message "U said T" to every user in the set CP of co-present users.

Figure 6:
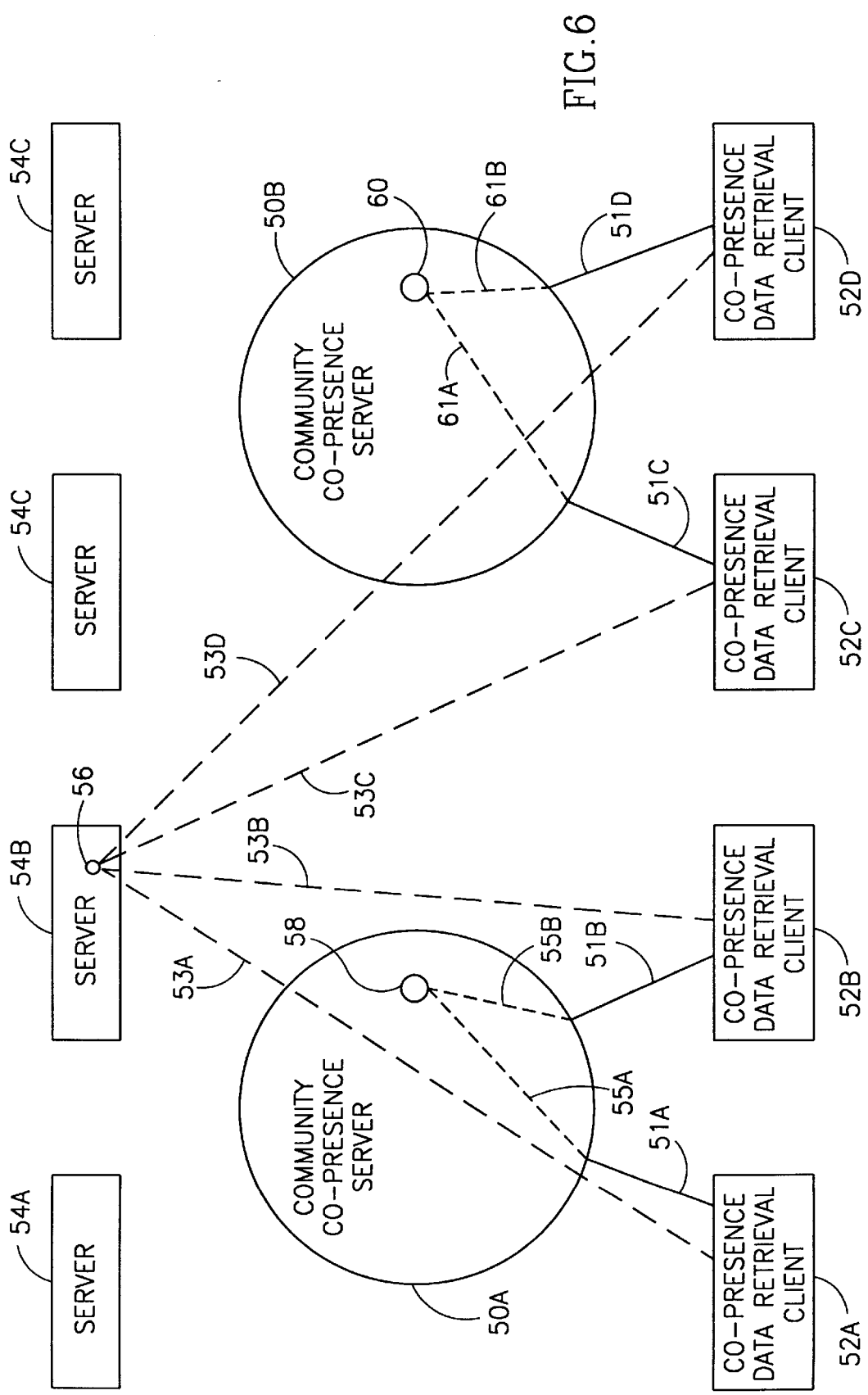
FIG. 6 is a schematic illustration of a community co-presence system, constructed and operative in accordance with a further preferred embodiment of the present invention.
Figure 7:
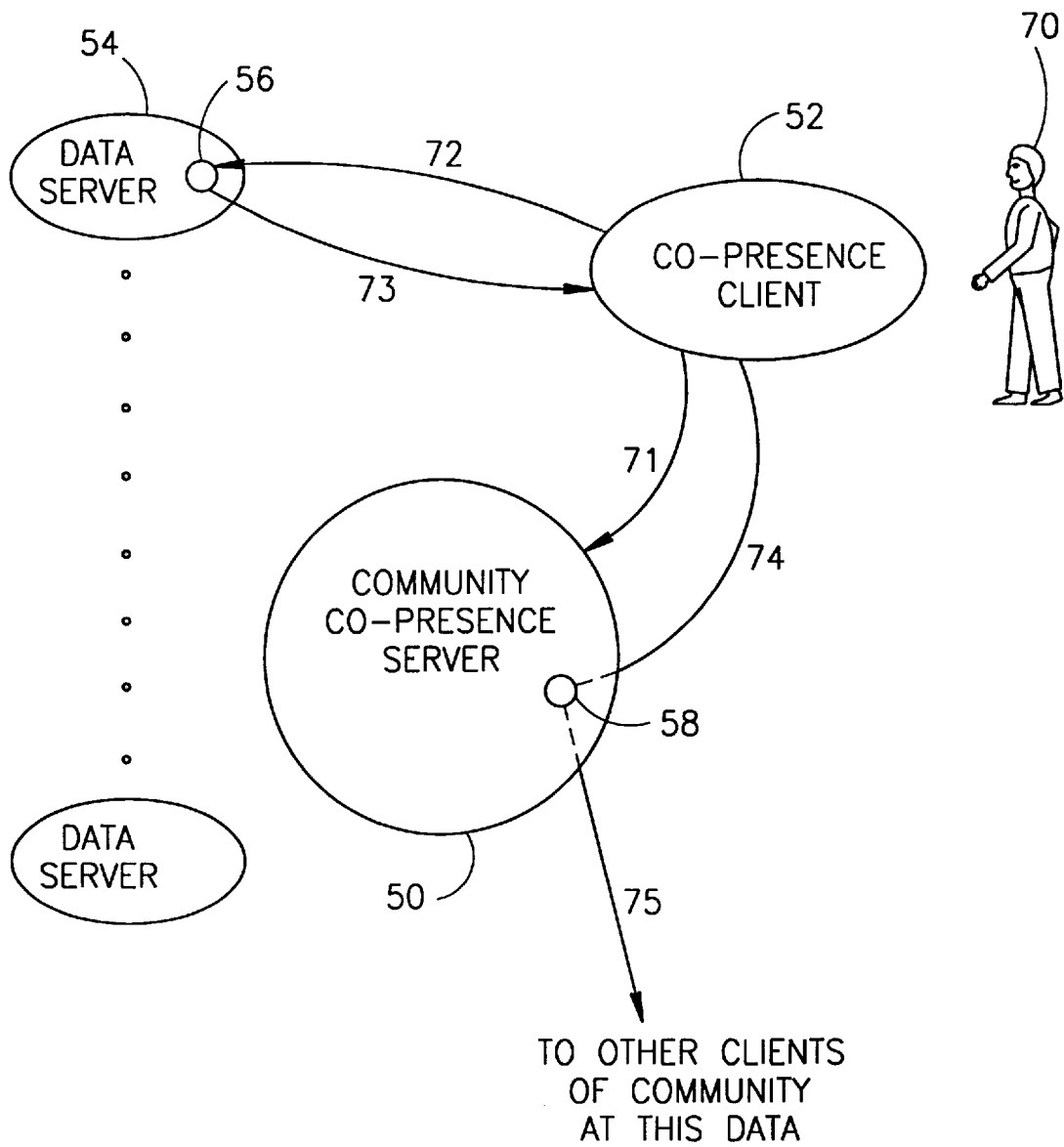
FIG. 7 is a schematic illustration of a co-present data retrieval operation within the system of FIG. 6.

Reference is now made to FIGS. 6 and 7 which illustrate a community co-presence server, constructed and operative in accordance with a further preferred embodiment of the present invention, and a method of operating it, respectively.

FIG. 6 shows two community co-presence servers 50A and 50B, four co-presence data retrieval clients 52A, 52B, 52C and 53D, and four data servers 54A, 54B, 54C and 54D. It will be appreciated that each community co-presence server 50 can operate with as many data servers 54 and data retrieval clients 52 as desired, four are illustrated as examples only.

Each community server 50 provides a community of co-present users, through the clients 52, all of whom are accessing data. Those users of one community looking at one piece of data, such as a web page, will be co-present with each other. However, those users of another community (who might, for example, be from another internet service provider) will not be co-present with the users of the first community. They will be co-present only with the users from their own community.

This is illustrated in FIG. 6. Clients 52A and 52B are associated with server 50A (see solid lines 51A and 51B) and clients 52C and 52D are associated with server 50B (solid lines 51C and 51D). When client 52A accesses a data object, labeled 56, in data server 54B, as indicated by dashed line 53A, community server 50A creates a virtual place 58 which is associated with data object 56 and to which client 52A is joined (dotted line 55A). When client 52B, also associated with community server 50A, accesses data object 56 (dashed line 53B), it will be joined (dotted line 55B) to virtual place 58 and will be co-present with client 52A already there. Thus, clients 52A and 52B see the same data object, know that each other is present at the data object and can converse with each other, either about the data object or about something else.

However, when client 52C accesses data object 56, as indicated by dashed line 53C, it will not be joined to virtual place 58 since that place belongs to community server 50A and client 52C belongs to community server SOB. Instead, community server 50B creates its own virtual place, labeled 60, associated with data object 56 and joins client 52C to it (as marked by dotted line 61A). When client 52D accesses data object 56, as indicated by dashed line 53D, community server SOB joins client 52D to virtual place 60 (as indicated by dotted line 61B) where client 52D will be co-present with client 52C.

It will be appreciated that, although all four clients 52 access the same piece of data object 56, each client 52 is co-present only with those other clients 52 belonging to its same community server 50.

The procedure for providing community co-presence is illustrated in FIG. 7. First, a user 70, through his "client" computer 52, becomes part of the community, typically by registering at the community co-presence server 50. This step is labeled step 71 and involves maintaining a list of users forming part of the community. In the second step (labeled 72), the user 70 accesses a data object, such data object 56, at a data server 54. In step 73, the data server 54 provides the data 56 to the client 52. In step 74, the client 52 sends a message to the virtual place 58 within the community co-presence server 50 which is associated with the data object 56 to the effect that user 70 has accessed the data object 56. The virtual place 58 then adds user 70 to the list of users present thereat. Finally, in step 75, community co-presence server 50 sends a message that client 52 has just accessed data object 56 to all of the other clients 52 listed in the list of users of virtual place 58.

It will be appreciated that steps 72, 73, 74 and 75 are similar respectively to steps 32, 34, 36 and 38 of FIG. 4. The actions performed are the same as those described hereinabove with the only difference being that virtual places are associated both with the data object 56 and the virtual place 58 or 60 of the particular community co-presence server.

Figure 8:
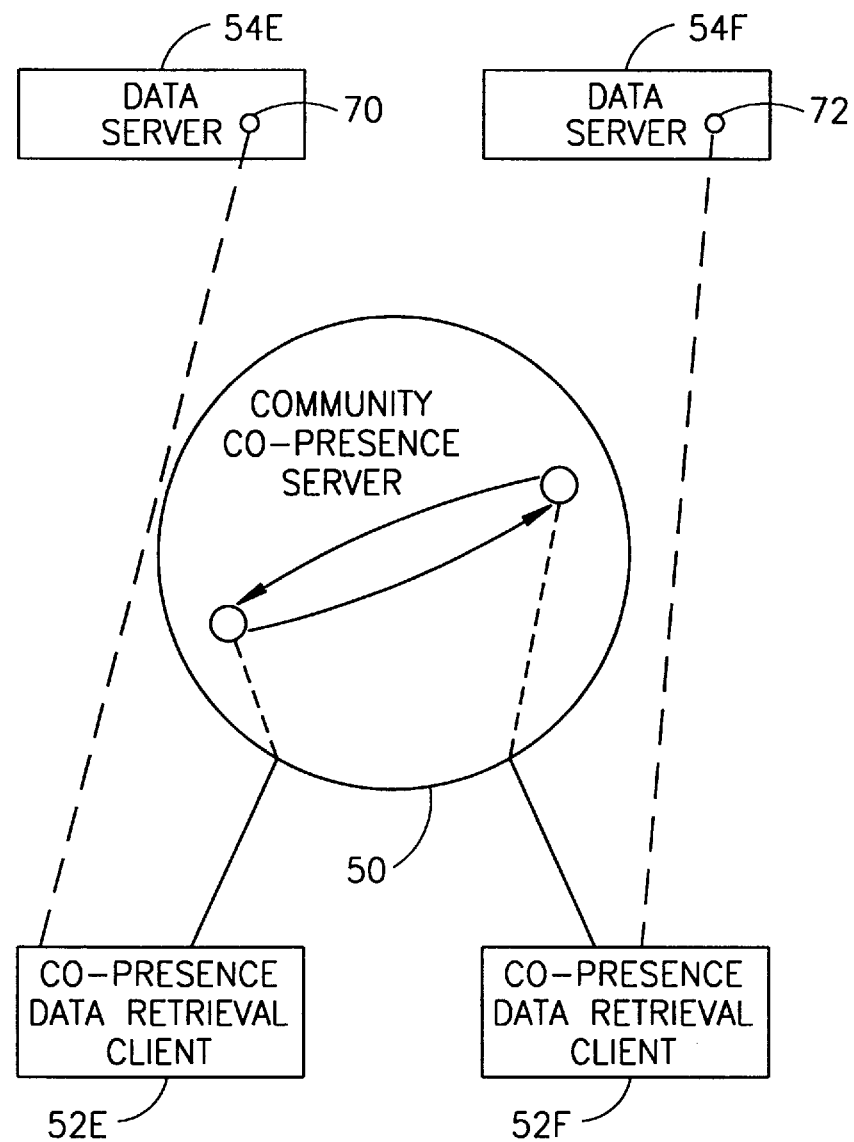
FIG. 8 is a schematic illustration of operations within the community co-presence server of FIG. 6.

Reference is now briefly made to FIG. 8 which illustrates a further feature of the community co-presence servers. FIG. 8 illustrates one server 50, two data servers 54E and 54F and two co-presence data retrieval clients 52E and 52F. In this Figure, both clients 52E and 52F are registered with server 50 but client 52E accesses data object 70 of data server 54E while client 52F accesses data object 72 of data server 54F. Thus, server 50 has two virtual places 74 and 76 respectively associated with data objects 70 and 72.

In accordance with a preferred embodiment of the present invention, server 50 can enable communication between the two clients 52E and 52F even though they are associated with two different virtual places 74 and 76 and therefore, are not co-present with each other. To initiate a conversation, one of the clients, for example 52E, requests that the server 50 "find" client 52F. Server 50 searches through the lists of clients associated with each of its virtual places 74, 76, etc. to find the virtual place at which client 52F is associated. If found, server 50 then opens a communication channel between the two clients via the virtual places. The two clients are not co-present but they can communicate since they are part of the same community.

It will further be appreciated that, if there is a communication channel between community co-presence servers, then a first client can search for a second client who is associated with another community co-presence server. The main server first searches among its virtual places and, if it does not find the desired client, it can request that the servers connected to it also search their virtual places. If one finds the desired client, then a communication channel between the two servers and, through them, between the two clients, can be opened.

It will be appreciated by persons skilled in the art that the present invention is not limited to what has been particularly shown and described hereinabove. Rather the scope of the present invention is defined by the claims which follow:

I claim:

1. A data retrieval system comprising:

a data server for retrieving at least one of a plurality of data objects from a data repository;

a co-presence server; and at least two co-presence data-retrieval clients for communicating at least with said data server and with said co-presence server;

said co-presence server comprising:

community means for at least maintaining a list of co-presence data retrieval clients associated with a community; and at least one virtual place having a list of co-presence data-retrieval clients from said community at said virtual place at least for enabling communication among said co-presence data-retrieval clients associated therewith, each of said co-presence data retrieval clients comprising:

object association means for associating a data object received from said data server with one of said at least one virtual places in said co-presence server; and co-presence means, associated with said one virtual place, for associating said client with said community and for enabling communication among said co-presence data-retrieval clients associated with said one virtual place.

2. A data retrieval system according to claim 1 and wherein said community means also comprises finding means for providing a first co-presence data retrieval client of a first virtual place with a second virtual place with which a second co-presence data retrieval client is associated and communication means for providing a communication channel between said first and second virtual places to enable communication between said first and second co-presence data retrieval clients.

3. A data retrieval system according to claim 1 and wherein said co-presence server comprises a changing plurality of place processes, one for each virtual place, and a managing process for providing communication from said co-presence data retrieval clients to said place processes.

4. A data retrieval system according to claim 1 and wherein said object association means comprises means for moving to a new virtual place.

* * * * *

UNITED STATES PATENT AND TRADEMARK OFFICE
CERTIFICATE OF CORRECTION

PATENT NO. : 5,864,874
DATED : January 26, 1999
INVENTOR(S) : Shapiro, Ehud

It is certified that error appears in the above-identified patent and that said Letters Patent is hereby corrected as shown below:

On the title page, under item [73] Assignee:

Delete "Italy" and insert --Israel--.

Signed and Sealed this

Twenty-seventh Day of July, 1999

Attest:

Q. TODD DICKINSON

Attesting Officer    Acting Commissioner of Patents and Trademarks